FIG. I.

United States Patent Office 3,763,117
Patented Oct. 2, 1973

3,763,117
AQUEOUS ALKALI REMOVABLE PRESSURE SENSITIVE ADHESIVES
Lawrence M. McKenna, Jr., Wilbraham, and Donald M. Gardner, Springfield, Mass., assignors to Monsanto Company, St. Louis, Mo.
Filed Sept. 21, 1971, Ser. No. 182,351
Int. Cl. C08f 15/40; C09j 7/02
U.S. Cl. 260—78.5 E             7 Claims

ABSTRACT OF THE DISCLOSURE

Disclosed herein are acrylate based pressure sensitive adhesives which are characterized by having good adhesive properties and water resistance at room temperature but which are easily removed or dispersed by hot aqueous alkaline solutions.

BACKGROUND OF THE INVENTION

(1) Field of the invention

The present invention relates to pressure sensitive adhesives. More particularly, the present invention relates to acrylate based pressure sensitive adhesives with good adhesive properties which are easily removed or dispersed by hot aqueous alkaline solutions.

(2) Description of the prior art

Acrylate based pressure sensitive adhesives are well known in the prior art. These materials, which adhere tenaciously to a wide variety of surfaces, find widespread use as the adhesive component in decals, labels, bumper stickers, decorative coatings, etc. One major problem encountered in the use of the pressure sensitive adhesives is the lack of water resistance in the adhesive resulting in the untimely removal of labels. Another problem is the removal of the adhesive after its useful life. In the case of labelled containers such as bottles, steel drums, etc. cleaning of the container and removal of the label is usually accomplished simultaneously by washing the container in a hot alkaline solution. However, those pressure sensitive adhesives with the high degree of aggressive tack which are needed for such applications are usually very resistant to hot alkaline solutions. Consequently, these labels must be soaked and removed mechanically in an extra processing step. The scraping required to remove the labels adds extra time and expense to the label removing operation. Moreover, the removed labels lose their value as recoverable paper broke if they cannot be dispersed in hot alkaline solutions.

Conversely, those pressure sensitive adhesives which are easily removable from a given substrate usually lack the water resistance, permanence, and aggressive tack required in certain of the applications mentioned above. Therefore, a definite need exists in the art for a pressure sensitive adhesive which has a high degree of aggressive tack as well as hot aqueous alkali removability.

SUMMARY OF THE INVENTION

The present invention provides pressure sensitive adhesives with good adhesive properties which have a high degree of water resistance but which are also easily removed or dispersed in hot concentrated alkaline solutions, thereby solving problems long standing in the prior art. These adhesives, which have an excellent balance of cohesive and adhesive properties, find wide-spread utility as a pressure sensitive adhesive component for decals, labels, bumper stickers, decorative laminates, etc., where properties of aggressive tack and aqueous alkali removability are required.

A necessary requisite of the aqueous alkali removal of pressure sensitive adhesives of the present invention is that they contain hydroxy groups and have a glass transition temperature ($T_g$) in the range of from $-20°$ C. to $-30°$ C. and a solubility parameter (S) in the range of from 9.9 to 10.3 and be soluble in hot (65° C.) concentrated (10%) alkali solutions.

Figure 1:
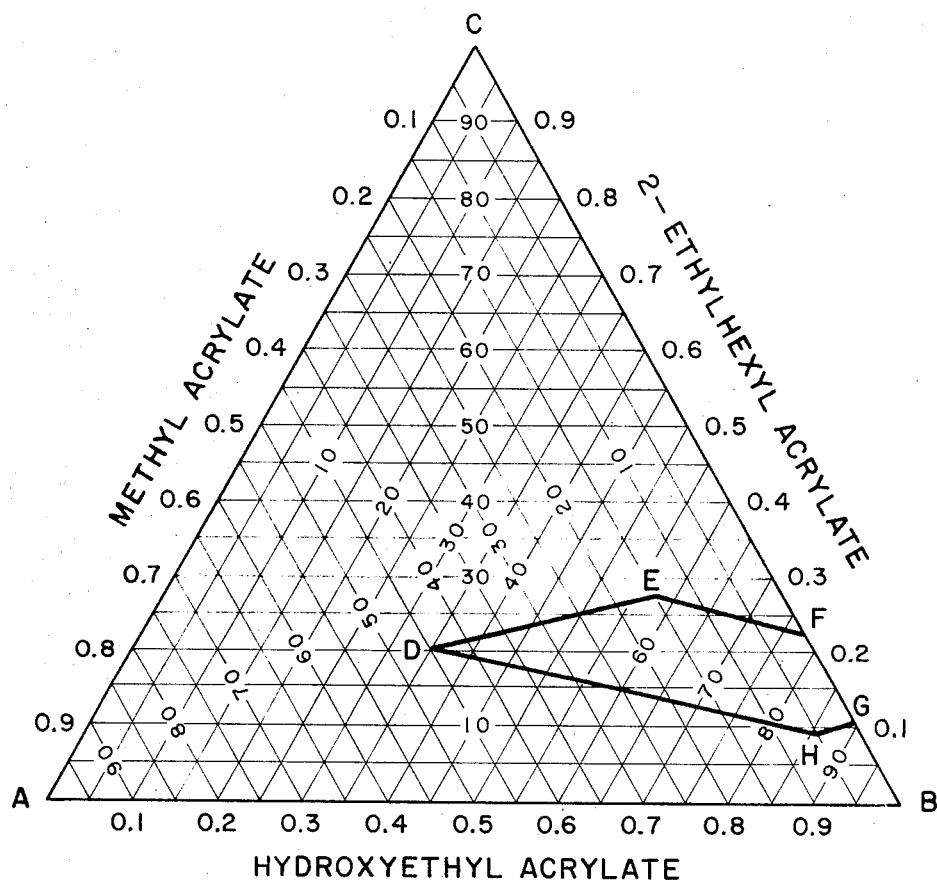
FIG. 1 is a three co-ordinate graph illustrating interpolymers prepared from 2-ethylhexylacrylate, methyl acrylate and hydroxyethyl acrylate which simultaneously meet the criteria of having a $T_g$ in the range of from $-30°$ C. to $-20°$ C. and a solubility parameter in the range of from 9.9 to 10.3. Axis AB lists the weight fraction of hydroxyethyl acrylate (HEA) monomer in the polymeric composition; axis BC lists the weight fraction of 2-ethylhexyl acrylate (2-EHA) monomer in the polymeric composition and axis AC lists the weight fraction of methyl acrylate (MA) monomer in the polymeric composition.

The region enclosed by the five-sided figure DEFGH includes all compositions for terpolymers which will meet the properties and performance criteria listed above. All other possible combinations of these monomers which lie outside the enclosed space will not simultaneously meet the required property requirements. Inspection of the figure shows it is necessary to have the following compositional ranges simultaneously in order to meet the properties and performance criteria.

| Component: | Weight fraction |
|---|---|
| 2-ethylhexyl acrylate | 0.09 to 0.27 |
| Methyl acrylate | 0 to 0.45 |
| Hydroxy ethyl acrylate | 0.35 to 0.90 |

FIG. II is a three co-ordinate graph illustrating interpolymers prepared from butyl acrylate, vinyl acetate and hydroxypropyl acrylate which simultaneously meet the criteria of having a $T_g$ in the range of from $-30°$ C. to $-20°$ C. and a solubility parameter in the range of from 9.9 to 10.3. Axis AB lists the weight fraction of hydroxypropyl acrylate (HPA) monomer in the polymeric composition; axis BC lists the weight fraction of butyl acrylate (BA) monomer in the polymeric composition; and axis AC lists the weight fraction of vinyl acetate (VOAC) monomer in the polymeric composition.

The region enclosed by the triangle DEF includes all compositions for the terpolymer compositions which will meet the properties and performance criteria listed above. All other possible combinations of these monomers which lie outside the enclosed space will not simultaneously meet the required property requirements. Inspection of FIG. II shows it is necessary to have the following compositional ranges simultaneously in order to meet the properties and performance criteria.

| Component: | Weight fraction |
|---|---|
| Butyl acrylate | 0.24 to 0.31 |
| Hydroxypropyl acrylate | 0.66 to 0.76 |
| Vinyl acetate | 0 to 0.51 |

DESCRIPTION OF THE PREFERRED EMBODIMENTS

The pressure sensitive adhesives of the present invention are prepared by interpolymerizing (1) a hydroxy bearing monomer, (2) a softening comonomer and optionally (3) a hardening comonomer wherein the hydroxy bearing monomers are selected from the group consisting of hydroxyalkyl acrylates, hydroxyalkyl methacrylates, hydroxyalkyl vinyl ether, hydroxyalkyl fumarates and hydroxyalkyl maleates, wherein the alkyl group contains from 2 to 4 carbon atoms; wherein the softening comonomer is an ester of acrylic or methacrylic acid containing from 4 to 20 carbon atoms in the alcohol moiety of the ester and mixtures of these esters with dialkyl maleates and dialkyl fumarates wherein the alkyl group contains from 4 to 20 carbon atoms; and wherein the hardening comonomer is selected from the group consisting of vinyl esters of alkanoic acids containing from 1 to 3 carbon atoms, ethyl and methyl esters of acrylic and methacrylic acid, ethyl and methyl diesters of maleic and fumaric acids; acrylonitrile, methacrylonitrile, styrene and vinyl chloride; with the proviso that the resulting interpolymer has a glass transition temperature ($T_g$) in the range of from −20° C. to −30° C. and a solubility parameter (S) in the range of from 9.9 to 10.3.

The amounts of each monomer can be varied within broad limits for any given system as long as the final polymeric product has a glass transition temperature ($T_g$) in the range of from −30° C. to −20° C. and a solubility parameter (S) in the range of from 9.9 to 10.3.

In general the amount of hydroxyl bearing monomer required to satisfy the above requirements will be in the range of from about 40 to about 80 percent by weight. The amounts of the other monomers used can then be readily calculated for any given system by one skilled in the art so as to obtain a polymer with a solubility parameter and a glass transition temperature within the above specified ranges.

These calculations are made by utilizing the principle of group additivity, whereby the properties of random copolymers may be calculated by averaging the known properties of homopolymers of the individual monomers. Thus, for a copolymer composed of $n$ comonomers, the solubility parameter S is calculated by summing the products of the weight fraction of each component and the solubility parameter of a homopolymer of that component. This can be expressed as $$S = \sum_{1}^{n} W_i S_i$$

wherein $n$ is the number of comonomers; $W_i$ is the weight fraction of the $i$th comonomer; and $S_i$ is the solubility parameter for an $i$ homopolymer. The solubility parameter can also be determined experimentally by noting the amount of swelling of a crosslinked form of the compound which occurs when it is treated with solutions of known solubility parameters. The former technique is described by J. A. Brydson in the December 1961 issue of the Journal of Plastics, page 107, which refers to the work of P. A. Small reported in the Journal of Applied Chemistry, 1953, vol. 3, page 71. K. C. Baranwal describes a method of the latter type in an article entitled "Cohesive Energy Densities of Elastomers" in Macromol. Chem., 1967, vol. 100, page 242.

Similarly, the glass transition temperature $T_g$ may be calculated by the equation:

$$\frac{1}{T_g} = \sum_{1}^{n} \frac{W_i}{T_{g_i}}$$

wherein $T_g$ is given in degrees absolute.

The special interpolymers of this invention are conveniently prepared by organic solvent polymerization techniques involving in some cases delayed addition of monomer when there is a great disparity between reactivity ratios as for example between the reactivity ratios of vinyl acetate and acrylate monomers. The time interval for the delayed addition may range from about 60 to about 600 minutes and longer. The technique in general, involves the polymerization of the respective monomer mixtures in suitable organic solvents, the polymerization being initiated by heat activated free radical initiators.

The choice of solvents for the interpolymer used in the practice of this invention is governed by the solubility requirements of the monomers and the resulting interpolymers should be soluble in the selected solvent or mixtures of solvents.

Examples of suitable solvents for the interpolymers include alcohols, such as ethanol, isopropanol and butanol, etc.; aromatic solvents such as benzene, toluene, xylene, etc.; esters such as ethyl acetate, propyl acetate, isopropyl acetate, butyl acetate, etc.; and ketones such as methyl ethyl ketone, acetone, etc. Especially useful are mixtures of the foregoing.

The resulting polymer solutions have a polymer solids content in the range of from 10 to 70% by weight and preferably in the range of from 30 to 60% by weight.

The polymer systems of this invention may also be prepared in mass, emulsion, latex or aqueous dispersion type polymerization processes as are well known to those skilled in the art. However, solution polymerization processes are preferred.

Polymerization initiators suitable for the preparation of the special interpolymers of this invention include organic peroxides, such as tert-butyl hydroperoxide, di-tert-butyl peroxide, cumene hydroperoxide, di-cumyl peroxide, benzoyl peroxide and the like. Equally suitable are organic peroxygen compounds such as tert-butyl peroxide acetate, tert-butyl perbenzoate, di-tert-butyl di-perphthalate; other initiators would include the azo type initiators such as $\alpha,\alpha'$-azo-diisobutyronitrile, as well as ultraviolet light, gamma radiation, etc.

Whatever specific polymerization conditions are chosen, they must be such that the average molecular weight of the resultant interpolymer is appropriate for use as a pressure sensitive adhesive. Thus, the relative viscosity of the interpolymer should be in the range of 0.80 to 6.0 and more preferably 1.5 to 3.0, when measured as a solution with a concentration of 2.0 grams per deciliter in benzene at 20.0° C.

The following examples are set forth in illustration of the present invention and should not be construed as being limitations thereof. Unless otherwise indicated all parts and percentages given are by weight.

EXAMPLE 1

An interpolymer having the desired balance of pressure sensitive adhesive and solubility properties is prepared by adding to a stirred, closed glass reaction vessel fitted with a reflux condenser, 138 grams hydroxyethyl acrylate, 37 grams 2-ethylhexyl acrylate, 30 grams methyl acrylate, and 210 grams of ethanol. This mixture is heated to reflux and a solution of 0.7 grams $\alpha,\alpha'$-azodiisobutyronitrile in 43 grams of ethanol is added to initiate polymerization. After 15 minutes a delayed monomer mixture, consisting of 280 grams hydroxyethyl acrylate, 85 grams 2-ethylhexyl acrylate and 73 grams methyl acrylate is added to the reaction at a rate of 4.0 grams per minute. During the same period, an additional 0.5 grams of initiator is also added. Reaction is continued at reflux for 5.5 hours; the viscous solution is then diluted with toluene and cooled. The resulting product is a clear, homogeneous polymer solution with a total solids content of 64% and a Brookfield viscosity of 8300 cps. The polymer contains 65 weight percent of hydroxyethyl acrylate, 19 weight percent of 2-ethylhexyl acrylate and 10 weight percent methyl acrylate and has a relative viscosity of 1.70. Reference to FIG. 1 shows that this composition is within the boundaries described in the figure. The calculated $T_g$ and S were −23° C. and 10.0, respectively.

The pressure sensitive adhesive properties of this interpolymer are tested and compared with a commercially available high quality pressure sensitive label. Labels are prepared by coating the solution on ordinary 70 lb. label stock and drying in a circulating air oven. Dry adhesive film thicknesses are in the range of 0.0005 to 0.001 inch. Probe tack, peel resistance and creep resistance tests are used to characterize adhesive properties. In the probe tack test, a flat, polished stainless steel probe is placed in contact with the surface of the adhesive under a presure of 0.13 lbs./in.$^2$ and then pulled off at a rate of 5 in. per minute after a 5 second dwell time. Ten separate determinations are made. The average force required to separate the probe from the adhesive surface is calculated and reported as pounds per square inch of contact area. A high degree of tack is preferred since it assures immediate wetting and good adhesion. In the peel resistance test, a label one inch wide is attached to a clean surface, rolled twice with a 4.5 pound rubber covered roller and peeled at a 180° angle after a dwell time of 20 minutes. Three separate determinations are made. The average force required to peel the label from the surface is calculated and reported in pounds per inch width. A high peel force is desired in most applications, since it assures the permanent attachment of the label. A peel force which is greater than the strength of the label stock is especially preferred for most applications since this prevents tampering or removal of labels without destruction of the label. In the creep resistance test, the cohesive strength of the label bond is determined by applying a static shear force of 1.1 pounds per square inch of bond area. The time to complete failure of the one square inch bond is determined in hours. Three separate determinations are made and an average calculated. This test characterizes the resistance of the label of sliding; a high value is preferred.

The results of the above described tests are given in Table I for the composition of this example and a commercial, high quality pressure sensitive label.

TABLE I

| Test | Commerical label | Example 1 |
| --- | --- | --- |
| Peel force, p.p.i.: | | |
| On stainless steel | 1.5 | [1] 3.7 |
| On glass | 3.4 | [1] 3.8 |
| Creep resistance, hours | 2.8 | 3.0 |
| Probe tack, p.s.i. | 0.7 | 0.6 |

[1] Label stock failure.

These results show that the adhesive composition is comparable to a high quality, commercial label adhesive with regard to tack and creep resistance. The peel strength, however, is significantly better, resulting in label destruction when the label is peeled from a glass or steel surface.

The aqueous alkali removability is tested using conditions similar to those for commercial cleaning operations. The solvent is a 10% solution of sodium hydroxide in tap water. The temperature of the bath is 65° C. The label should separate from the surface within one minute of immersion time with either no agitation or very slight swirling of the solution. A label prepared with the interpolymer of this example floated from a glass surface in less than one mintue with no agitation. The commercial label used in the above tests did not separate even after 5 minutes with rapid agitation of the solution.

As a further test of the practical utility of the polymer given in this example, its sensitivity to bond deterioration by moisture was tested. A label prepared with the interpolymer described above was applied to a glass surface and immersed in water overnight. No bond deterioration was observed by this extreme test. Attempts to peel the label from the glass resulted only in destruction of the label stock. This is an extremely desirable property for any label adhesive since it assures good performance under conditions of high humidity or when exposed to outdoor weathering.

EXAMPLE 2

A procedure similar to that of Example 1 is used to prepare an interpolymer comprising 68% by weight hydroxylpropyl acrylate, 28% by weight butyl acrylate and 4% by weight vinyl acetate.

Figure 2:
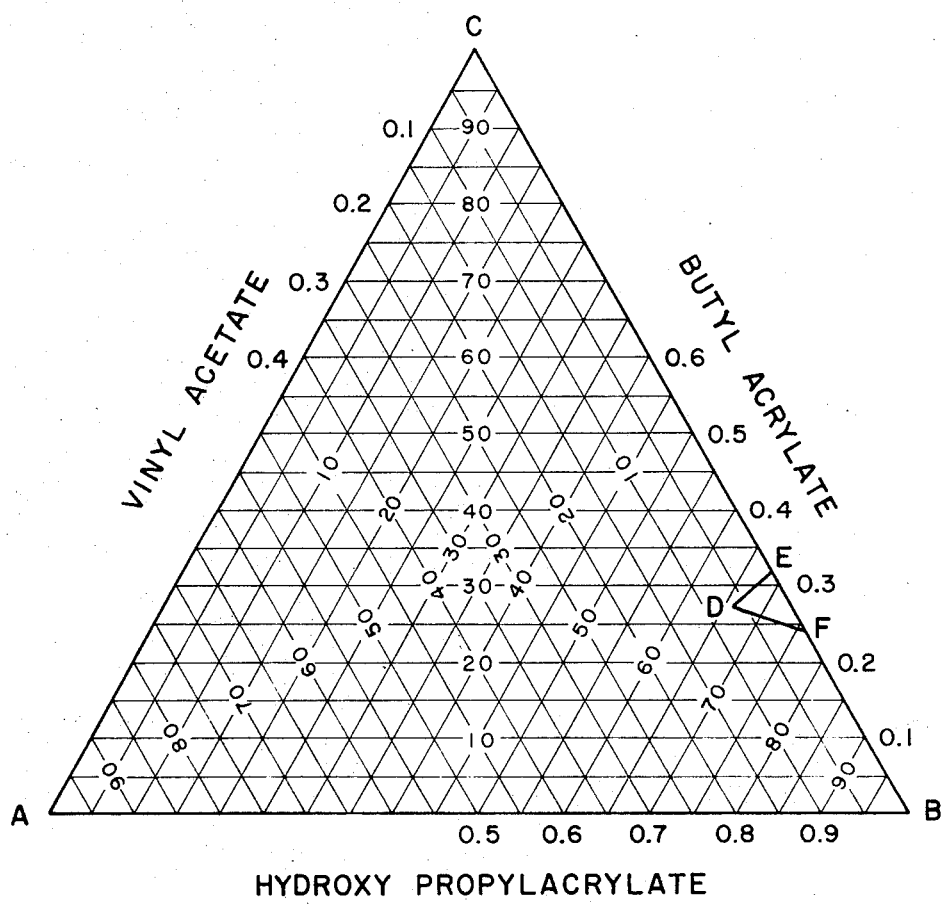

This composition was selected from the region DEF shown in FIG. 2.

To a stirred, closed glass reaction vessel fitted with a refluxed condenser is added 200 grams of hydroxypropyl acrylate, 55 grams of butyl acrylate, 24 grams of vinyl acetate and 250 grams of ethanol. This mixture is heated to reflux and a solution of 1.0 grams α,α'-azodiisobutyronitrile in 32 grams of ethanol is added to initiate polymerization. After 15 minutes of reaction a delayed monomer mixture, consisting of 200 grams hydroxypropyl acrylate and 110 grams of butyl acrylate is added at a rate of 3.4 grams per minute. During the same period an additional 0.6 grams of initiator is also added. Reaction is continued at reflux for 6.0 hours and then the viscous solution is diluted with toluene and cooled. The final polymer solution has a solids content of 60% by weight and a Brookfield viscosity of 4500 cps. The relative viscosity of this polymer is 1.95 and the calculater $T_g$ and S are −21° C. and 9.9, respectively. The peel force, creep resistance and probe tack force test measurements are 3.2 p.p.i., 4.0 hours, and 0.5 p.s.i., respectively.

Labels prepared with this adhesive were removed in less than one minute when soaked in the hot aqueous alkali solution.

The following Examples 3 and 4, which are prepared using the same three monomers used in Example 1 above, illustrate the necessity of observing the critical glass transition temperature and solubility requirements in order to obtain a polymeric composition that possesses the desired pressure sensitivity and hot aqueous alkali solubility. Although the interpolymers of Examples 3 and 4 are qualitatively similar to that given in Example 1, the exact monomer ratios chosen given materials which do not simultaneously meet the required $T_g$ and S range specifications and thus fall outside the boundary limits shown in FIG. 1.

EXAMPLE 3

Using the polymerization techniques described in Example 1, an interpolymer is prepared which comprises 55% by weight methyl acrylate, 30% by weight 2-ethylhexyl acrylate and 15% by weight hydroxyethyl acrylate. The relative viscosity of this polymer is 2.10 and the calculated $T_g$ and S are −23° C. and 9.7, respectively. The peel force, creep resistance and probe tack force are 3.0 p.p.i., 5.5 hours and 0.5 p.s.i., respectively. These values characterize the interpolymer as a suitable label adhesive. However, the aqueous alkali removability is very poor. Even after a five minute soak in the aqueous alkali solution, the label prepared with this interpolymer showed no indication of separating from a glass surface.

EXAMPLE 4

Another polymeric composition is prepared according to the procedure given in Example 1 which comprises 50% by weight methyl acrylate, 42% by weight hydroxyethyl acrylate and 8% by weight of 2-ethylhexyl acrylate. The relative viscosity is 2.20 and the calculated $T_g$ and S are −8° C. and 10.1, respectively. This interpolymer has excellent aqueous alkali removability but very poor performance as a label adhesive. The peel force, creep resistance and probe tack force are 1.0 p.p.i., 0.1 hour (adhesive failure in the creep test) and O (no detectable reading), respectively.

The following Examples 5 to 10 are set forth in tabular form to illustrate some of the many variations that are possible within the scope of the present invention.

TABLE 11.—SUMMARY OF EXAMPLES 5 TO 10

| | Polymeric composition | | | |
| --- | --- | --- | --- | --- |
| Example | Monomer | Wt. percent monomer | $T_g$, °C. | S |
| 5 | HEA/2EHA/AN | 40/45/15 | −30 | 10.0 |
| 6 | HPA/2EHA/AN | 40/40/20 | −23 | 10.2 |
| 7 | HEMA/HEA/2EHA | 20/50/30 | −25 | 9.9 |
| 8 | HEA/BA/VCl | 60/30/10 | −26 | 0.0 |
| 9 | HPA/2EHA/styrene | 73/22/5 | −20 | 9.9 |
| 10 | HEA/2EHA/MA | 45/25/30 | −25 | 9.9 |

The polymeric compositions of the foregoing examples have excellent pressure sensitive adhesive characteristics and are readily soluble in hot aqueous alkali solutions.

Ordinarily in the art, aqueous alkali solubility is obtained in a polymeric system by introduction of carboxylic acid groups into the system. This is accomplished by using a carboxylic acid comonomer such as crotonic acid, acrylic acid, itaconic acid, etc. The resulting polymers are soluble in dilute, aqueous sodium hydroxide solutions whereas the corresponding polymers, without carboxylic acid groups, are not.

The following Examples 11 to 19 illustrate the unexpected adverse effect that a carboxylic acid comonomer has on the aqueous alkali solubility of the polymers of the present invention at high caustic concentrations. A hot 10% caustic solution is generally used in the industry for cleaning metal drums and other such containers. This high concentration is required for effective cleaning of the container. The polymeric composition of Example 10 is used as a control in Examples 11, 14 and 17. In Examples 12, 15 and 18 the amount of hydroxyethyl acrylate is reduced to 44% by weight and 1% by weight of acrylic acid monomer is introduced into the polymer. In Examples 13, 16 and 19 the amount of hydroxyethyl acrylate is reduced to 42% and 3% of acrylic acid monomer is introduced into the polymer.

Solubilities of free films of the dried polymers are then tested at various solution temperatures and caustic concentrations. Immersion time is kept constant at 0.5 hours and no agitation is used. The results of these tests are shown in Table III below.

TABLE III.—SUMMARY OF EXAMPLES 11 TO 19
[Percent solubles in aqueous alkali]

| Example | Percent acrylic acid in polymer | Temp., °C. | Percent NaOH | | | |
|---|---|---|---|---|---|---|
| | | | 0 | 2.0 | 5.0 | 10.0 |
| 11 | 0 | 25 | 0 | 0 | | 3 |
| 12 | 1 | 25 | 2 | 2 | | 1 |
| 13 | 3 | 25 | 3 | 2 | | 0 |
| 14 | 0 | 40 | | 0 | 65 | 60 |
| 15 | 1 | 40 | | 19 | 37 | 0 |
| 16 | 3 | 40 | | 21 | 36 | 5 |
| 17 | 0 | 65 | 3 | 100 | 100 | 100 |
| 18 | 1 | 65 | 2 | 99 | 100 | 5 |
| 19 | 3 | 65 | 4 | 97 | 99 | 0 |

The polymer composition of the present invention which is free of acid groups (Examples 11, 14 and 17) is insoluble at low temperature in water and low caustic concentration. This illustrates the good water resistance of these polymers. At higher caustic levels and higher temperature, the polymer which is prepared according to the teachings of the present invention shows very rapid solubility. On the other hand, the polymers with very small amounts of acid groups present rapidly develop good solubility as the temperature is raised at intermediate caustic concentrations, but become essentially insoluble at 10% caustic. In addition, polymers prepared with 1–5% carboxylic acid group-containing comonomers show a tendency to crosslink rapidly on accelerated aging of the dried film resulting in loss of adhesive and solubility properties. Consequently, these polymers are not suitable for use as removable label adhesives on containers which are cleaned in high concentrations of hot caustic.

The pressure sensitive polymeric compositions of the present invention are especially adapted for use as pressure sensitive adhesives which are water resistant to water or warm dilute alkali solutions but which are readily soluble in hot concentrated alkali solutions such as 10% sodium hydroxide solution at 65° C. These polymers are coated onto a wide variety of substrates which are then used as labels, tapes, bumper stickers, signs, decorative coverings, decals, etc. Substrates which are coated with the polymers of the present invention include cellulosic substrates such as paper, fiberboard, cloth, etc.; glass tapes, synthetic polymeric films such as polyethylene terephthalate, polycarbonate styrene, vinyl chloride, vinylidene chloride, etc.; metal foils such as aluminum, copper, steel, etc.

The polymeric compositions may be further modified with stabilizers, anti-oxidants, dyes, tackifiers, extenders and other additives commonly used in the pressure sensitive adhesive art.

From the foregoing it should be apparent that many modifications are possible without departing from the spirit and scope of the present invention.

What is claimed is:

1. A pressure sensitive polymeric composition comprising an interpolymer consisting essentially of (A) from 40 to 80% by weight of a hydroxy bearing monomer selected from the group consisting of hydroxyalkyl acrylates, hydroxyalkyl methacrylates, hydroxyalkylvinyl ether, hydroxyalkyl fumarates and hydroxyalkyl maleates, wherein the alkyl group contains from 2 to 4 carbon atoms; and (B) from 20 to 60% by weight of at least one other monomer selected from the group consisting of (a) esters of acrylic or methacrylic acid containing from 4 to 20 carbon atoms in the alcohol moiety of the ester and mixtures of these esters with dialkyl maleates and alkyl fumarates wherein the alkyl group contains from 4 to 20 carbon atoms; and (b) vinyl esters of alkanoic acids containing from 1 to 3 carbon atoms, ethyl and methyl esters of acrylic and methacrylic acid; ethyl and methyl diesters of maleic and fumaric acid, acrylonitrile, methacrylonitrile, styrene and vinyl chloride; wherein the polymeric composition has a glass transition temperature in the range of from −20° C. to −30° C.; a solubility parameter in the range of from 9.9 to 10.3 and a relative viscosity in the range of from 1.5 to 3.0 when measured as a 2.0 g./dl. solution in benzene at 20° C.

2. A pressure sensitive polymeric composition comprising an interpolymer consisting essentially of from 9 to 27 percent by weight of 2-ethylhexyl acrylate, from 0 to 45 percent by weight of methyl acrylate, and from 35 to 90 percent by weight of hydroxyethyl acrylate based on the total weight of the monomers, wherein the polymeric composition has a glass transition temperature in the range of from −20° C. to −30° C., a solubility parameter in the range of from 9.9 to 10.3 and a relative viscosity in the range of from 1.5 to 3.0 when measured as a 2.0 g./dl. solution in benzene at 20° C.

3. A pressure sensitive polymeric composition comprising an interpolymer consisting essentially of from 24 to 31 percent by weight of butyl acrylate, from 66 to 76 percent by weight of hydroxypropyl acrylate and from 0 to 7 percent by weight of vinyl acetate based on the total weight of the monomers, wherein the polymeric composition has a glass transition temperature in the range of from −20° C. to −30° C., a solubility parameter in the range of from 9.9 to 10.3 and a relative viscosity in the range 1.5 to 3.0 when measured as a 2.0 g./dl. solution in benzene at 20° C.

4. A substrate coated on at least one side with a pressure sensitive polymeric composition comprising an interpolymer consisting essentially of from 9 to 27 percent by weight of 2-ethylhexyl acrylate, from 0 to 45 percent by weight of methyl acrylate and from 35 to 90 percent by weight of hydroxyethyl acrylate based on the total weight of the monomers, wherein the polymeric composition has a glass transition temperature in the range of from −20° C. to −30° C., a solubility parameter in the range of from 9.9 to 10.3 and a relative viscosity in the range of from 1.5 to 3.0 when measured as a 2.0 g./dl. solution in benzene at 20° C.

5. A substrate coated on at least one side with a pressure sensitive polymeric composition comprising an interpolymer consisting essentially of from 24 to 31 percent by weight of butyl acrylate, from 66 to 76 percent by weight of hydroxypropyl acrylate and from 0 to 7 percent by weight of vinyl acetate based on the total weight of the monomers, wherein the polymeric composition has a glass transition temperature in the range of from −20° C. to −30° C., a solubility parameter in the range of from 9.9 to 10.3 and a relative viscosity in the range of from 1.5 to 3.0 when measured as a 2.0 g./dl. solution in benzene at 20° C.

6. A substrate coated on at least one side with a pressure sensitive polymeric composition which is soluble in hot aqueous alkali solutions, which composition comprises the interpolymerization product of (A) from 40 to 80% by weight of a hydroxy bearing monomer selected from the group consisting of hydroxyalkyl acrylates, hydroxyalkyl methacrylates, hydroxyalkylvinyl ether, hydroxyalkyl fumarates and hydroxyalkyl maleates, wherein the alkyl group contains from 2 to 4 carbon atoms; and (B) from 20 to 60% by weight of at least one other monomer selected from the group consisting of (a) esters of acrylic or methacrylic acid containing from 4 to 20 carbon atoms in the alcohol moiety of the ester and mixtures of these esters with dialkyl maleates and alkyl fumarates wherein the alkyl group contains from 4 to 20 carbon atoms; and (b) vinyl esters of alkanoic acids containing from 1 to 3 carbon atoms, ethyl and methyl esters of acrylic and methacrylic acid; ethyl and methyl diesters of maleic and fumaric acid, acrylonitrile, methacrylonitrile, styrene and vinyl chloride; wherein the polymeric composition has a glass transition temperature in the range of from −20° C. to −30° C.; a solubility parameter in the range of from 9.9 to 10.3 and a relative viscosity in the range of from 1.5 to 3.0 when measured as a 2.0 g./dl. solution in benzene at 20° C.

7. A coated substrate as in claim 6 which is in the form of a label.

References Cited
UNITED STATES PATENTS

| | | | |
|---|---|---|---|
| 3,172,868 | 3/1965 | Jefferson | 260—2.5 |
| 3,269,994 | 8/1966 | Horn | 260—86.1 |
| 3,222,419 | 12/1965 | Jubilee | 260—836 |

JOSEPH L. SCHAFER, Primary Examiner

J. KIGHT, Assistant Examiner

U.S. Cl. X.R.

117—122 P, PA, S, 143 A, 161 UT; 260—33.6 PQ, 78.5 B, 80.75, 80.81, 86.1 R, E